Oct. 6, 1925.
R. G. FRIES ET AL
1,555,839
BED CASTER AND THE LIKE
Filed Nov. 29, 1921
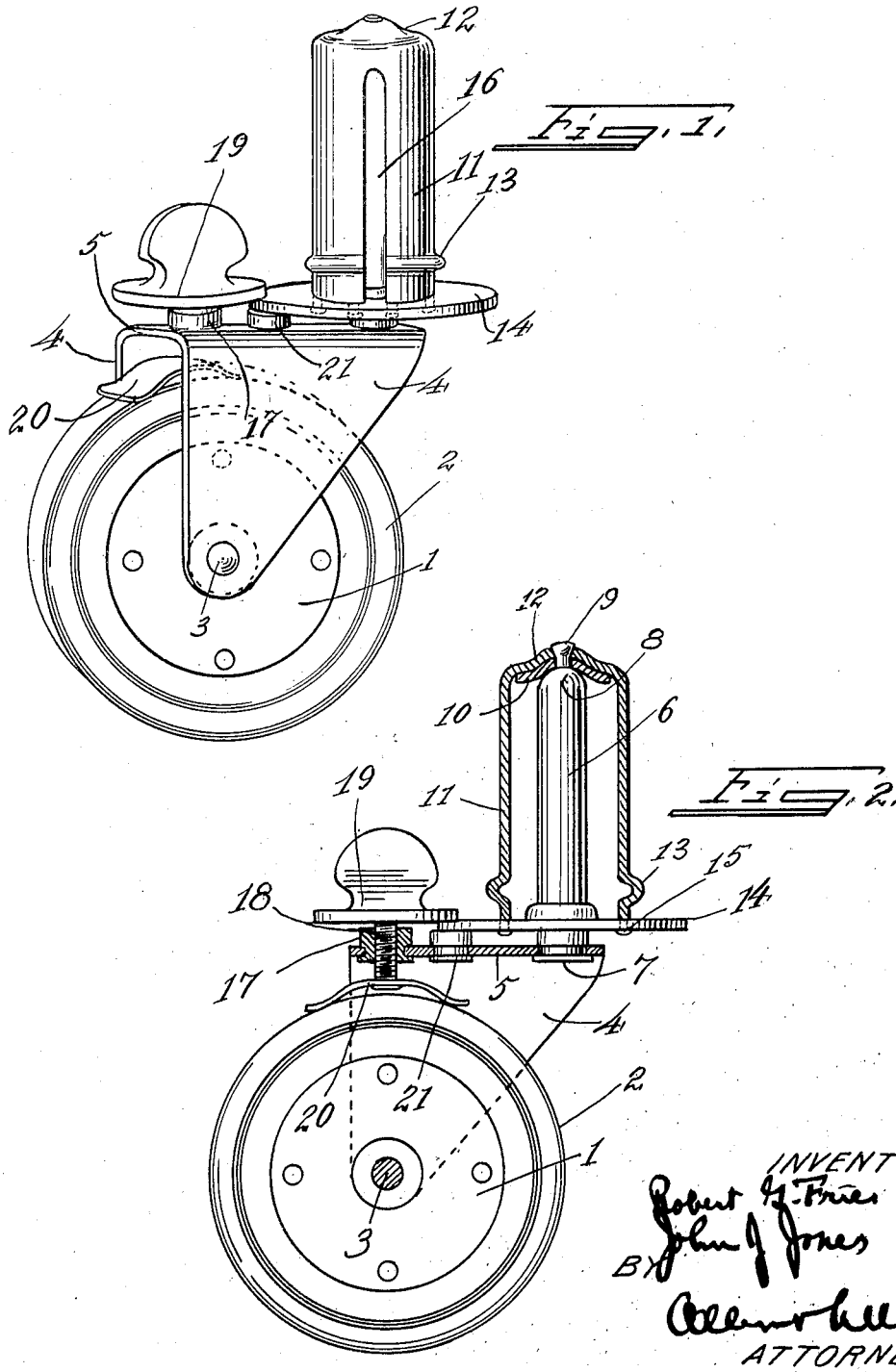

Patented Oct. 6, 1925.

1,555,839

UNITED STATES PATENT OFFICE.

ROBERT G. FRIES AND JOHN J. JONES, OF CINCINNATI, OHIO, ASSIGNORS TO THE SURGEON'S SPECIALTY COMPANY, OF CINCINNATI, OHIO, A CORPORATION OF OHIO.

BED CASTER AND THE LIKE.

Application filed November 29, 1921. Serial No. 518,664.

*To all whom it may concern:*

Be it known that we, ROBERT G. FRIES and JOHN J. JONES, citizens of the United States, and residents of Cincinnati, in the county of Hamilton and State of Ohio, have invented certain new and useful Improvements in Bed Casters and the like, of which the following is a full, clear, and exact description, reference being had to the accompanying drawings, forming part of this specification.

Our invention relates to casters as used for beds and the like and more particularly where used for hospital beds, operating tables, or the like.

It is of particular importance in beds of surgical patients in hospitals and like instances, that it be possible to lock the casters against any movement, and to prevent looseness and rattling of all kinds.

The slightest jar or vibration caused by a loose caster, upon a slight movement of the patient, causes great annoyance, due to the extreme sensitiveness to pain, and where tilting devices are used with the beds there must not be any tendency on the part of the beds to slip on the floor.

It is the object of our invention to provide a caster in which the wheel turns readily on its axis and the wheel support revolves freely on its vertical pivot, and in which both actions can be quickly and effectively blocked, so as to obtain entire rigidity of the caster structure.

It is also our object to provide a caster device of the above character which is quickly and easily constructed and made of parts which may be stamped out and rapidly assembled.

These objects we accomplish by that certain construction and arrangement of parts to be hereinafter more specifically pointed out and claimed.

In the drawings,

Figure 1 is a perspective view of the device.

Figure 2 is a section through the same, showing the caster wheel in elevation.

Considering the typical structure selected by us for illustrating our invention, it will be noted in the drawings that the caster wheel 1 has a rubber tire 2 and an axle pin 3, the tire being caught between the two disks making up the body 1, which same are riveted together.

A piece of metal cut into roughly triangular form is folded to straddle the caster wheel by its sides 4, 4, and to overlie the wheel by its top 5. The axle pin of the caster wheel is set through holes at the tapered, lowered ends of the sides 4, and riveted over to form a permanent assembly of caster wheel and caster wheel support.

We have not shown any roller-bearing devices, or attempted to go into details as to the caster, since this construction may be modified according to requirements.

A post 6 is provided for the caster wheel support, said post being channeled and thrust through a hole in the flat top of the support and its end expanded at 7 to hold it permanently in place. The upper end of this post is formed into a dome shape as at 8, with a narrowed portion or nipple 9 extending upwardly from the dome.

Over this dome is set a dome-shaped washer of hard metal, as shown at 10, which washer permits the nipple to extend through it for purposes of attachment to the furniture socket piece.

The socket piece is formed of a cylindrical body 11, with its upper end closed with a dome-shaped portion 12, which has a hole for passage of the nipple. In assembling, the nipple is thrust through the hole and expanded at the end to form a permanent connection.

The socket piece, its diameter being controlled by the furniture into which it is to be placed, is formed with a peripheral bead 13, which acts as a bearing point for the lower edges of a furniture leg surrounding the hole into which the socket is thrust.

A plate 14, of a size suitable for the form of furniture intended, is mounted to the socket by the thrusting through holes therein of tongues 15 on the socket. These tongues may be of the desired number and are riveted over on the ends that extend through the plate. The plate, as shown, is formed up around the point through which the caster wheel support post is passed, but it does not sustain the weight of the furniture, and is used as a friction disk in locking.

The socket piece is formed with ribs 16 extending lengthwise thereof, to engage within the furniture leg and prevent turning of the piece within the leg. The socket is thus held fast in the furniture and the plate is also held against revolution.

In the top of the caster wheel support is set a stud 17, formed internally as a nut, said stud having a channel therein and adapted to be thrust through the support with its end expanded to retain it permanently in place.

A screw 18 is held in this nut, said screw having a wing head 19, which is of sufficient diameter to bear against the plate 14. On the lower end the screw has swiveled thereon a small brake piece 20, which, when the screw is turned down, bears against the tire of the caster wheel and holds it tightly against revolution.

A stud 21 set into the support in the same manner as the post and nut-stud is of a height to bear against the under side of the plate 14 when the head of the screw comes down against it and enforces a slight springing of the parts together.

The bearing for the caster support post having the dome-shaped end and washer, which lies beneath the dome-shaped cap in the furniture leg socket, permits easy and free revolution in the nature of a ball. Some of the weight of the furniture may be borne directly on this ball-like bearing, and the bead around the socket piece takes the immediate burden.

The turning down of the single screw acts to clamp the caster against revolution primarily. A continued motion expands the small brake shoe and permits the caster support to be frictionally clamped to the plate 14.

We have not attempted to point out variations from the single design of caster shown in the drawings, but do not intend by this that our claims be limited beyond the usual range of equivalents for the structures set forth.

Having thus described our invention, what we claim as new and desire to secure by Letters Patent, is:—

1. A caster wheel device comprising a member to be inserted into the leg of a piece of furniture, a circular plate at the lower end of said member, a caster wheel support mounted to rotate with relation to the plate and member, and a clamp on the caster support to engage said plate to hold the caster wheel support against rotation said caster wheel support having a projection to engage the under side of the said plate.

2. A caster wheel device comprising a member to be inserted into the leg of a piece of furniture, a plate at the lower end of the member, a caster wheel support mounted to rotate with relation to the plate and member, a caster wheel in the support, and a screw mounted in the caster wheel support, said screw having thereon a clamping device to engage the plate, and a brake to engage the caster wheel.

3. A caster device comprising a caster wheel support having depending sides and a top, a caster wheel having an axle set into the sides, a nut set into the top, and a screw in the nut, said screw having thereon a brake piece to engage the periphery of the caster wheel, means for mounting said caster wheel support rotatably in the leg of a piece of furniture, and means on the screw to clamp the caster wheel support against rotation with relation to the furniture leg.

4. In a device of the character described, a member to be set into the leg of a piece of furniture, said member having a tubular body and a closed top and bottom, a caster wheel support having a post passing through the bottom of said member and engaging rotatably in the top thereof, a caster wheel revoluble in said support, a screw mounted in the support, said screw having a shoe thereon to act as a brake against the caster wheel, and a member extended from the support adapted to frictionally engage the closed bottom of the tubular member.

ROBERT G. FRIES.
JOHN J. JONES.